(12) United States Patent
Chen et al.

(10) Patent No.: US 11,542,344 B2
(45) Date of Patent: Jan. 3, 2023

(54) ZIEGLER-NATTA CATALYSTS FOR THE PRODUCTION OF POLYETHYLENE

(71) Applicant: Dow Global Technologies LLC, Midland, MI (US)

(72) Inventors: Linfeng Chen, Missouri City, TX (US); Kurt F. Hirsekorn, Sugar Land, TX (US); Mehmet Demirors, Pearland, TX (US); Teresa P. Karjala, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 9 days.

(21) Appl. No.: 17/057,766

(22) PCT Filed: May 29, 2019

(86) PCT No.: PCT/US2019/034287
§ 371 (c)(1),
(2) Date: Nov. 23, 2020

(87) PCT Pub. No.: WO2019/231978
PCT Pub. Date: Dec. 5, 2019

(65) Prior Publication Data
US 2021/0388124 A1    Dec. 16, 2021

Related U.S. Application Data

(60) Provisional application No. 62/679,274, filed on Jun. 1, 2018.

(51) Int. Cl.
| C08F 4/658 | (2006.01) |
| C08F 2/04 | (2006.01) |
| C08F 2/44 | (2006.01) |
| C08F 10/02 | (2006.01) |

(52) U.S. Cl.
CPC .............. *C08F 4/6585* (2013.01); *C08F 2/44* (2013.01); *C08F 10/02* (2013.01)

(58) Field of Classification Search
USPC ............... 526/115, 116, 121, 125.3; 502/132
See application file for complete search history.

(56) References Cited

U.S. PATENT DOCUMENTS

| 4,198,315 A | 4/1980 | Birkelbach et al. |
| 4,292,200 A | 9/1981 | Berger et al. |
| 4,399,053 A | 8/1983 | Shipley et al. |
| 4,612,300 A | 9/1986 | Coleman |
| 5,405,817 A * | 4/1995 | Kuo ........................ C08F 10/00 502/115 |
| 6,759,362 B2 | 7/2004 | Job |
| 9,255,160 B2 | 2/2016 | Desjardins et al. |
| 9,688,795 B2 | 6/2017 | Cerk et al. |
| 2009/0264282 A1 | 10/2009 | Wang et al. |
| 2016/0272732 A1 | 9/2016 | Zhang et al. |

FOREIGN PATENT DOCUMENTS

| EP | 2712874 A1 | 4/2014 |
| GB | 2102439 A | 2/1983 |
| JP | 3577786 B2 | 6/1995 |
| WO | 2007061587 A1 | 5/2007 |
| WO | 2011023532 A1 | 3/2011 |
| WO | 2017040127 A1 | 3/2017 |
| WO | 2018005821 A1 | 1/2018 |
| WO | 2018011086 A1 | 1/2018 |
| WO | 2018060116 A1 | 4/2018 |

OTHER PUBLICATIONS

Luiz Claudio De Santa Maria, "Preparation of Ziegler-Natta catalyst based on TiCl4 modified with metal chlorides for copolymerization of ethylene and propene", Polymer vol. 36(14), 1995, pp. 2845-2849.
International Search Report and Written Opinion pertaining to PCT/US2019/034287, dated Sep. 18, 2019.
English Translation of Chinese Office Action date Aug. 30, 2022, pertaining to CN Patent Application No. 201980040746.6, 8 pgs.

* cited by examiner

*Primary Examiner* — Fred M Teskin
(74) *Attorney, Agent, or Firm* — Dinsmore & Shohl LLP

(57) ABSTRACT

The heterogeneous procatalyst of this disclosure includes a titanium species; a hydrocarbon soluble transition metal compound having a structure $M(OR^1)_z$; a chlorinating agent having a structure $A(Cl)_x(R^2)_{3-x}$, and a magnesium chloride component. M of $M(OR^1)_z$ is a non-reducing transition metal other than titanium, the non-reducing transition metal being in an oxidation state of +2 or +3. Each $R^1$ is independently $(C_1$-$C_{30})$hydrocarbyl or $—C(O)R^{11}$, where $R^{11}$ is $(C_1$-$C_{30})$hydrocarbyl. Subscript z of $M(OR^1)_z$ is 2 or 3. Each $R^1$ and $R^{11}$ may be optionally substituted with one or more than one halogen atoms, or one or more than one $—Si(R^S)_3$, where each $R^S$ is $(C_1$-$C_{30})$hydrocarbyl. A of $A(Cl)_x(R^2)_{3-x}$ is aluminum or boron; $R^2$ is $(C_1$-$C_{30})$hydrocarbyl; and x is 1, 2, or 3; and a magnesium chloride component.

20 Claims, No Drawings

ZIEGLER-NATTA CATALYSTS FOR THE PRODUCTION OF POLYETHYLENE

CROSS REFERENCE TO RELATED APPLICATIONS

This application is a National Stage Entry under 35 U.S.C. § 371 of International Patent Application No. PCT/US2019/034287, filed May 29, 2019, which claims priority to U.S. Provisional Application 62/679,274, filed Jun. 1, 2018, both of which are incorporated herein by reference in their entireties.

TECHNICAL FIELD

Embodiments of the present disclosure generally relate to catalyst compositions for polymerizing ethylene and optionally one or more α-olefins, the polymerization processes that utilize such catalyst compositions, and the process of preparing such catalyst compositions, specifically heterogeneous procatalyst.

BACKGROUND

Olefin-based polymers such as ethylene-based polymers and propylene-based polymers are produced using various catalysts. The components of such catalysts used in the polymerization process of the olefin-based polymers are important factors contributing to the characteristics and properties of such olefin-based polymers.

Ethylene-based polymers are manufactured for use in a wide variety of articles. The polyethylene polymerization process can be varied in a number of respects to produce a wide variety of resultant polyethylene resins having different physical properties that render the various resins suitable for use in different applications. Hydrogen may also be added to the reactor. The catalysts for producing ethylene-based polymers may typically comprise a chromium-based catalyst, a Ziegler-Natta catalyst, and/or a molecular (either metallocene or non-metallocene) catalyst. Either periodically or continuously, part of the reaction mixture, including the polyethylene product formed, together with unreacted ethylene and one or more optional co-monomers, is removed from the reactor. The reaction mixture, when removed from the reactor, may be processed to remove the polyethylene product from the unreacted reactants, with the unreacted reactants typically being recycled back into the reactor. Alternatively, the reaction mixture may be sent to a second reactor, serially connected to the first reactor, where a second polyethylene fraction may be produced.

Conventional polymers produced by Ziegler-Natta catalysts generally contain relatively large amounts of high density fractions. A reduction in the high density fraction may potentially allow for improvement in optical and film mechanical properties. Despite the research efforts in developing catalysts suitable for ethylene polymerization, there is still a need to develop Ziegler-Natta catalysts that are capable of producing ethylene-based polymers having a small amount of high density fraction, especially to develop such catalysts which have high catalyst efficiency.

SUMMARY

Ongoing needs exist to create catalyst compositions that are capable of producing ethylene-based polymers with small amounts of high density fractions, polymerization processes for producing ethylene-based polymers with small amounts of high density fractions, and processes for preparing catalyst compositions.

Embodiments of this disclosure include heterogeneous procatalysts. The heterogeneous procatalysts may contain a titanium species, a non-reducing transition metal compound having a structure $M(OR^1)_z$, a chlorinating agent having a structure $A(Cl)_x(R^2)_{3-x}$, and a magnesium chloride component.

In the structure $M(OR^1)_z$ of the transition metal compound, M is a transition metal in an oxidation state of +2 or +3. The transition metal, M, may be non-reducing. $R^1$ is $(C_1\text{-}C_{30})$hydrocarbyl or $—C(O)R^{11}$, wherein $R^{11}$ is $(C_1\text{-}C_{30})$hydrocarbyl. Each of $R^1$ and $R^{11}$ may be optionally substituted with one or more than one halogen atom or one or more than one groups $—Si(R^S)_3$, where each $R^S$ is independently $(C_1\text{-}C_{30})$hydrocarbyl. Subscript z of $M(OR^1)_z$ is 2 or 3. The transition metal compound is hydrocarbon soluble.

In the structure $A(Cl)_x(R^2)_{3-x}$ of the chlorinating agent, A is aluminum or boron; $R^2$ is $(C_1\text{-}C_{30})$hydrocarbyl; and x is 1, 2, or 3.

In one or more embodiments, the magnesium chloride component is a preformed MgCl2 slurry in hydrocarbon solvent.

In one or more embodiments, the heterogeneous procatalyst further contains a vanadium component.

In embodiments, processes for polymerizing ethylene-based polymers include contacting ethylene and optionally one or more α-olefins in the presence of a catalyst, in which the catalyst comprises a heterogeneous procatalyst.

In embodiments, processes for producing heterogeneous procatalysts include preparing a $MgCl_2$ slurry in a hydrocarbon solvent. The process further includes mixing a chlorinating agent, a hydrocarbon-soluble, non-reducing transition metal compound, and titanium species into the $MgCl_2$ slurry. The non-reducing transition metal compound has a structure according to $M(OR^1)_z$ and the chlorinating agent has a structure $A(Cl)_x(R^2)_{3-x}$.

DETAILED DESCRIPTION

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x\text{-}C_y)$" means that the unsubstituted form of the chemical group has from x carbon atoms to y carbon atoms, inclusive of x and y. For example, a $(C_1\text{-}C_{50})$alkyl is an alkyl group having from 1 to 50 carbon atoms in its unsubstituted form. In some embodiments and general structures, certain chemical groups may be substituted by one or more substituents such as $R^S$.

The term "$(C_1\text{-}C_{50})$hydrocarbyl" means a hydrocarbon radical of from 1 to 50 carbon atoms, in which each hydrocarbon radical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1\text{-}C_{50})$hydrocarbyl may be an unsubstituted or substituted $(C_1\text{-}C_{50})$alkyl, $(C_3\text{-}C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—CH$_2$—C$_6$H$_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

The term "halogen atom" or "halogen" means the radical of a fluorine atom (F), chlorine atom (Cl), bromine atom (Br), or iodine atom (I). The term "halide" means the anionic form of the halogen atom: fluoride (F$^-$), chloride (Cl$^-$), bromide (Br$^-$), or iodide (I$^-$).

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers.

In this disclosure, "ethylene-based polymer" refer to homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene-based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene. Common forms of ethylene-based polymer known in the art include Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE).

Ziegler-Natta catalysts typically comprise a procatalyst and a cocatalyst. Key components in a Ziegler-Natta procatalyst include a titanium species, a magnesium chloride (MgCl$_2$) support, and optionally an electron donor. In some embodiments, a titanium precursor and a magnesium precursor are chlorinated and converted into a Ziegler-Natta procatalyst using a chlorinating agent, optionally in the presence of an electron donor. In some embodiments, a magnesium chloride support is premade from a magnesium precursor, followed by introduction of a titanium species, which may undergo chlorination using a chlorinating agent. In some specific embodiments, the chlorination of the titanium species proceeds in the absence of an electron donor. In some specific embodiments, the chlorination of the titanium species proceed in the presence of an electron donor. The magnesium chloride support may be prepared via chlorination of a magnesium compound. In some embodiments, the magnesium chloride support is made by chlorination of a solution of a hydrocarbon-soluble magnesium precursor to afford a MgCl$_2$ slurry in the same hydrocarbon solvent used for making the magnesium precursor solution. In some embodiments, a magnesium chloride support is prepared before introducing other procatalyst components, such magnesium chloride support is also called preformed magnesium chloride support, for example, a preformed MgCl$_2$ slurry.

In some embodiments, a non-reducing, hydrocarbon-soluble transition metal compound in an oxidation state of +2 or +3 is used together with a titanium compound for making a Ziegler-Natta procatalyst. In some embodiments, the Ziegler-Natta procatalyst is made using a preformed MgCl$_2$ slurry in the same hydrocarbon solvent used for making the magnesium precursor solution. In some embodiments, the non-reducing transition metal compound is soluble in the hydrocarbon solvent of the MgCl$_2$ slurry. Not intending to be bound by any theory, it is believed that being soluble in the hydrocarbon solvent of the MgCl$_2$ slurry affords better dispersion of the transition metal compound in the slurry and facilitate interaction between the transition metal compound and MgCl$_2$ surface. In some embodiments, a chlorinating agent is also employed in the synthesis of the Ziegler-Natta procatalyst. In some embodiments, a preformed MgCl$_2$ slurry, a titanium compound, a non-reducing, hydrocarbon-soluble transition metal compound in an oxidation state of +2 or +3, and a chlorinating agent are used for making a Ziegler-Natta procatalyst. The addition of the titanium compound, the transition metal compound, and the chlorinating agent to the MgCl$_2$ slurry can be conducted simultaneously, together, or in any sequence (see following table) (When 2 or 3 materials are listed together, they are premixed and added together, or they are added simultaneously).

| First Addition | Second Addition | Third Addition |
|---|---|---|
| Chlorinating Agent | Transition Metal Compound | Titanium Compound |
| Chlorinating Agent | Titanium Compound | Transition Metal Compound |
| Transition Metal Compound | Chlorinating Agent | Titanium Compound |
| Transition Metal Compound | Titanium Compound | Chlorinating Agent |
| Titanium Compound | Chlorinating Agent | Transition Metal Compound |
| Titanium Compound | Transition Metal Compound | Chlorinating Agent |
| Chlorinating Agent/Transition Metal Compound | Titanium Compound | |
| Titanium Compound | Chlorinating Agent/Transition Metal Compound | |
| Chlorinating Agent/Titanium Compound | Transition Metal Compound | |
| Transition Metal Compound | Chlorinating Agent/Titanium Compound | |
| Transition Metal Compound/Titanium Compound | Chlorinating Agent | |
| Chlorinating Agent | Transition Metal Compound/Titanium Compound | |
| Chlorinating Agent/Transition Metal Compound/Titanium Compound | | |

The inventors surprisingly discovered that the inclusion of the non-reducing, hydrocarbon-soluble transition metal compound in an oxidation state of +2 or +3 in the procatalyst significantly reduces the polymer high density fraction in the resultant polyethylene copolymer. While not wishing to be bound by theory, it is believed that reaction between the transition metal compound and the chlorinating agent converts the transition metal compound into a species that is not hydrocarbon-soluble and deposits onto the MgCl$_2$ surface, thus changing the nature of interaction between the MgCl$_2$ support and the active titanium species and resulting in changes in polymer composition. Further improvements in polymer properties were also unexpectedly obtained from inclusion of a vanadium compound in the procatalyst. The vanadium compound can be introduced to the procatalyst with other procatalyst components simultaneously, together, or in any sequence.

In some embodiments, a chlorinating agent is added to MgCl$_2$ before other components. In some embodiments, less than 10% of the non-reducing, hydrocarbon-soluble transition metal compound remains in the solution phase 30 minutes after being added to the chlorinating agent-treated MgCl$_2$. In another embodiment, less than 5% of the non-reducing, hydrocarbon-soluble transition metal compound remains in the solution phase 75 minutes after being added to the chlorinating agent-treated MgCl$_2$.

The reaction temperatures for adding each procatalyst component to MgCl$_2$ may be the same or different. In some embodiments, the reaction temperature may be chosen from −30° C. to 200° C., or 0° C. to 100° C., or 20° C. to 50° C.

The reaction time for adding each procatalyst component to MgCl$_2$ may be the same or different. In some embodiments, the reaction time may be chosen from 1 minutes to 10 days, or 10 minutes to 24 hours, or 30 minutes to 12 hours.

Embodiments of this disclosure include heterogeneous procatalysts. The heterogeneous procatalysts may contain a titanium species, a hydrocarbon soluble transition metal compound having a structure $M(OR^1)_z$, a chlorinating agent has a structure $A(Cl)_x(R^2)_{3-x}$, and a magnesium chloride component.

In the structure $M(OR^1)_z$ of the transition metal compound, M is a transition metal having an oxidation state of +2 or +3. The transition metal, M, may be non-reducing and may not include Ti. The term "transition metal" refers to elements in Groups 3-12 according to the IUPAC nomenclature, and does not include lanthanides or actinide elements. In one or more embodiments, the transition metal, M, is chosen from the first row transition metal (also called Period 4 transition metals). In some embodiments, M is chosen from zinc, copper, cobalt, manganese, iron, or chromium.

In the hydrocarbon soluble transition metal compound, each $R^1$ of $M(OR^1)_z$ may independently be chosen from $(C_1-C_{30})$hydrocarbyl or —$C(O)R^{11}$, where $R^{11}$ is $(C_1-C_{30})$ hydrocarbyl. Subscript z of $M(OR^1)_z$ is 2 or 3. The transition metal compound is soluble in a hydrocarbon solvent. In one or more embodiments, each $R^1$ and $R^{11}$ may be optionally substituted with one or more than one halogen atoms, or one or more than one —$Si(R^S)_3$, where each $R^S$ is $(C_1-C_{30})$ hydrocarbyl. In some embodiments, $R^1$ and $R^{11}$ may be chosen from methyl, ethyl, propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In some embodiments, when $R^1$ is —$C(O)R^{11}$, $R^{11}$ may be chosen from 3-heptyl and 2-methyloctan-2-yl. In one or more embodiments, the hydrocarbon soluble transition metal compound may be a metal salt of naphthenic acids. Naphthenic acids are mixtures of cycloaliphtic carboxylic acids and may be represented by the formula $C_nH_{2(n-z)}O_2$, where n is 5 to 30; and z is 0 to 4. In a non-limiting example, when the hydrocarbon soluble transition metal compound is a metal salt of naphthenic acid, $R^1$ is —$C(O)R^{11}$ and $R^{11}$ may be (3-ethyl)-2-cyclohepentyl-2-ethyl. The naphthenic acids may be isolated from crude oil.

In some embodiments, when $R^1$ or $R^{11}$ of the transition metal compound is substituted with one or more groups —$Si(R^S)_3$, $R^S$ may be chosen from methyl, ethyl, n-propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In some embodiments, when $R^1$ is —$C(O)R^{11}$, $R^{11}$ may be chosen from 3-heptyl and 2-methyloctan-2-yl.

In some embodiments, the transition metal compound is a metal alkoxide or carboxylate with melting point equal to or less than 50° C., preferably equal to or lower than 35° C., most preferably equal to or lower than 25° C. In some embodiments, the transition metal compound $M(OR^1)_z$ or $M(OC(O)R^{11})_z$ contains a $(C_1-C_{10})$hydrocarbyl substitution at the 2-position of the $R^1$ or $R^{11}$ group. In one or more embodiments, M is chosen from zinc, cobalt, copper, manganese, iron, or chromium. In some embodiments, the transition metal compound is chosen from zinc(II) 2-ethylhexanoate, zinc(II) neodecanoate, zinc(II) naphthenate, cobalt(II) 2-ethylhexanoate, cobalt(II) neodecanoate, cobalt (II) naphthenate, copper(II) 2-ethylhexanoate, copper(II)

neodecanoate, copper(II) naphthenate, manganses(II) 2-ethylhexanoate, manganses(II) neodecanoate, manganses(II) naphthenate, iron(III) 2-ethylhexanoate, iron(III) neodecanoate, iron(II) naphthenate, iron(III) ethoxide, chromium (III) 2-ethylhexanoate, chromium(III) neodecanoate, or chromium(III) naphthenate.

In the structure $A(Cl)_x(R^2)_{3-x}$ of the chlorinating agent, A is aluminum or boron; $R^2$ is $(C_1-C_{30})$hydrocarbyl; and subscript x is 1, 2, or 3. In one or more embodiments, subscript x is 2; and $R^2$ is chosen from chosen from methyl, ethyl, n-propyl, 2-propyl, n-butyl, tert-butyl, iso-butyl, n-pentyl, n-hexyl, n-heptyl, n-octyl, tert-octyl, n-nonyl, or n-decyl. In some embodiments, subscript x is 3.

In some embodiments, the chlorinating agent may be chosen from aluminum trichloride, methylaluminum dichloride, dimethylaluminum chloride, ethylaluminum dichloride, diethylaluminum chloride, ethylaluminum sesquichloride, isobutylaluminum dichloride, diisobutylaluminum chloride, n-hexylaluminum dichloride, di-n-hexylaluminum chloride, n-octylaluminum dichloride, di-n-octylaluminum chloride, and combinations thereof.

In one or more embodiments, the heterogeneous procatalyst further contains a vanadium component. The vanadium component may be chosen from $VX_4$, $VOX_3$, or $VO(OR^3)_3$, where each X is independently a halogen atom or $(C_1-C_{40})$ heterohydrocarbyl; and $R^3$ is $(C_1-C_{20})$hydrocarbyl or —$C(O)R^{31}$, where $R^{31}$ is $(C_1-C_{30})$hydrocarbyl. In one or more embodiments, $R^3$ and $R^{31}$ may be chosen from methyl, ethyl, n-propyl, 2-propyl, n-butyl, tert-butyl, iso-butyl, n-pentyl, n-hexyl, n-heptyl, n-octyl, tert-octyl, n-nonyl, or n-decyl. In some embodiments, when $R^1$ is —$C(O)R^{31}$, $R^{31}$ is 3-heptyl.

In some embodiments, the vanadium component is chosen from vanadium (IV) chloride, vanadium(V) oxytrichloride, vanadium(V) oxytrimethoxide, vanadium(V) oxytriethoxide, vanadium(V) oxytripropoxide, vanadium(V) oxytriisopropoxide, vanadium(V) oxytributoxide, vanadium (V) oxytriisobutoxide vanadyl acetate, vanadium(IV) oxide stearate, vanadium octanoate, and combinations thereof.

In embodiments, processes for polymerizing ethylene-based polymers include contacting ethylene and optionally one or more α-olefins in the presence of a catalyst system, in which the catalyst system comprises one heterogeneous procatalyst or more than one heterogeneous procatalysts.

In embodiments, processes for producing heterogeneous procatalysts include forming magnesium chloride ($MgCl_2$) in a hydrocarbon solvent as a $MgCl_2$ slurry. Then, mixing a chlorinating agent, a transition metal compound, and titanium species into the $MgCl_2$ slurry, in which the transition metal compound has a structure $M(OR^1)_z$ and the chlorinating agent has a structure $A(Cl)_x(R^2)_{3-x}$.

In one or more embodiments of the heterogeneous catalyst, the magnesium chloride component has a surface area of greater than or equal to 100 $m^2/g$ as measured according to the BET method. In some embodiments, the magnesium chloride component has a surface area of greater than or equal to 150 $m^2/g$, or greater than or equal to 200 $m^2/g$. In other embodiments, the magnesium chloride component has a surface area of from 100 $m^2/g$ to 800 $m^2/g$, or 200 $m^2/g$ to 600 $m^2/g$, or from 300 $m^2/g$ to 500 $m^2/g$.

In one or more embodiments, the magnesium chloride includes a high surface area which can be obtained from chlorination of magnesium compounds. Such magnesium compounds include organomagnesium, organomagnesium halide, magnesium alkoxide, carbonated magnesium alkoxide, magnesium carboxylate, and combinations thereof. In embodiments, magnesium chloride may be obtained from conversion of magnesium chloride adducts. Suitable magnesium chloride adducts include magnesium chloride adducts with alcohols and magnesium chloride adducts with ethers. In some embodiments, the magnesium chloride adducts are magnesium chloride adducts with ethanol. In some embodiments, the magnesium chloride adducts are magnesium chloride adducts with tetrahydrofuran.

In one or more embodiments, the magnesium chloride components include, for example, the reaction product of a chloride source with a hydrocarbon soluble hydrocarbylmagnesium compound or mixture of compounds. Exemplary organomagnesium compounds include di($C_1-C_{20}$)alkylmagnesium or di($C_1-C_{20}$)arylmagnesium compounds, particularly di(n-butyl)magnesium, di(sec-butyl)magnesium, diisopropylmagnesium, di-n-hexylmagnesium, isopropyl-n-butyl-magnesium, ethyl-n-hexylmagnesium, ethyl-n-butylmagnesium, di-n-octylmagnesium, and combinations thereof. Exemplary suitable magnesium diaryls include diphenylmagnesium, dibenzylmagnesium and ditolylmagnesium. The organomagnesium compounds may optionally be treated with an organoaluminum compound for improving solubility, reducing solution viscosity, or both improving solubility and reducing solution viscosity. Stabilizers, including those derived from substituted phenol compounds, may also be present. Additional suitable organomagnesium compounds include alkyl- and aryl-magnesium alkoxides, aryloxides and chlorides, as well as mixtures of the foregoing. Highly preferred organomagnesium compounds are the halogen-free organomagnesium compounds.

Among the chloride sources which can be employed in the preparation of the magnesium chloride component for use herein include metallic chlorides and nonmetallic chlorides, including organochlorides and hydrogen chloride. Suitable metallic chlorides, which can be employed herein, include a formula according to: $MR_{y-a}Cl_a$, wherein: M is a metal of Groups 13, 14 or 15 of the Periodic Table of Elements; R is a monovalent organic radical; y has a value corresponding to the valence of M, and a has a value from 1 to y.

In one or more embodiments, metallic chlorides may be chosen from alkylaluminum chlorides having the formula: $AlR_{3-a}Cl_a$, wherein: each R is independently $(C_1-C_{10})$hydrocarbyl, preferably $(C_1-C_6)$alkyl, and a is a number from 1 to 3. The alkylaluminum chlorides may include, and are not limited to: ethylaluminum sesquichloride, diethylaluminum chloride, and ethylaluminum dichloride, with ethylaluminum dichloride being especially preferred. Alternatively, a metal chloride such as aluminum trichloride or a combination of aluminum trichloride with an alkyl aluminum chloride or a trialkyl aluminum compound may be suitably employed.

Suitable nonmetallic chlorides and organochlorides are represented by the formula $R'Cl_r$, wherein R' is hydrogen, $(C_1-C_{10})$hydrocarbyl, or a non-metal such as Si, P, Ga or Ge; and subscript r is an integer from 1 to 6. Particularly suitable chloride sources include, for example, hydrogen chloride and active organochlorides such as t-alkyl chlorides, sec-alkyl chlorides, allyl chlorides, and benzyl chlorides and other active hydrocarbyl chlorides wherein hydrocarbyl is as defined herein before. By an active organic chloride is meant a hydrocarbyl chloride that contains a labile chloride at least as active, that is, as easily lost to another compound, as the chloride of sec-butyl chloride, preferably as active as t-butyl chloride. In addition to the organic monochlorides, it is understood that organic dichlorides, trichlorides and other polychlorides that are active as defined herein before are also suitably employed. Examples of preferred chloride sources include hydrogen chloride, t-butyl chloride, t-amyl chloride, allyl chloride, benzyl chloride, crotyl chloride, and diphenylmethyl chloride. Most preferred are hydrogen chloride, t-butyl chloride, allyl chloride and benzyl chloride.

In some embodiments, the chloride compound may be hydrochloride gas. In embodiments, the organomagnesium compound and the chloride compound may be contacted at a temperature of from −25° C. to 100° C., or from 0° C. to 50° C. In some embodiments, heat removal is needed in order to control set reaction temperature within ±5° C., such as within ±3° C. In some embodiments, the amount of chloride source is controlled in order to achieve a target molar ratio of Cl to Mg in the resulting $MgCl_2$. For example, the molar ratio of Cl to Mg can be from 1.8 to 2.0 for a chloride-deficient $MgCl_2$ support, or from 2.0 to 2.2 for a chloride-rich $MgCl_2$ support. In some embodiments, the slurry of organomagnesium compound and metallic or non-metallic chloride may be contacted for a time of from 1 hour to 12 hours, or from 4 hours to 6 hours. The concentration of the organomagnesium compound in the slurry (i.e., before the chloride compound is added to the slurry) may be sufficient so that when the chloride compound is added to the slurry, the resultant composition may include a concentration of magnesium of from 0.005 moles per liter (mol/L) to 1.000 mol/L.

In some embodiments, the $MgCl_2$ slurry is prepared before being treated with other procatalyst component and is referred to herein as a "preformed $MgCl_2$ slurry." In some embodiments, the $MgCl_2$ slurry may have a concentration of $MgCl_2$ of from 0.005 mol/L to 10.00 mol/L, or from 0.05 mol/L to 1.00 mol/L.

The magnesium chloride support can be preformed from the organomagnesium compound and the chloride source and stored for later use or it can be preformed in situ in which instance the procatalyst is preferably prepared by mixing in a suitable solvent or reaction medium (1) the organomagnesium component and (2) the chloride source, followed by the other procatalyst components.

In one or more embodiments, the titanium species may be a titanium species having catalytic activity. In some embodiments, titanium species are $TiCl_{4-c}(OR)_c$ or $TiCl_{3-d}(OR)_d$, wherein R is $(C_1-C_{20})$hydrocarbyl, c is 0, 1, 2, 3, or 4, and d is 0, 1, 2, or 3. For example, in some embodiments, the titanium species may include, but is not limited to, titanium (IV) tetrachloride, titanium (III) trichloride, tris(2,2,6,6-tetramethyl-3,5-heptanedionato)titanium(III), trichlorotris (tetrahydrofuran) titanium(III), di-n-butoxytitanium(IV) dichloride, diethoxytitanium(IV) dichloride, diisopropoxytitanium(IV) dichloride, diisobutoxytitanium(IV) dichloride, triisopropoxytitanium(IV) chloride, tri-n-butoxytitanium (IV) chloride, triisobutoxytitanium(IV) chloride, titanium (IV) tetraisopropoxide ($Ti(O^iPr)_4$), titanium(IV) ethoxide, titanium(IV) n-butoxide, titanium(IV) isobutoxide, titanium (IV) 2-ethylhexoxide, dichlorobis(2,2,6,6-tetramethyl-3,5-heptanedionato)titanium(IV), tetrachlorobis(tetrahydrofuran) titanium(IV), methyltitanium (IV) trichloride, or combinations thereof. In some embodiments, the titanium species may be titanium (IV) tetrachloride or titanium(IV) tetraisopropoxide ($Ti(O^iPr)_4$). For example, in some embodiments, the titanium species may include a titanium halide, a titanium alkoxide, or combinations thereof. For example, in some embodiments, the titanium species may include, but is not limited to, titanium tetrachloride ($TiCl_4$), titanium(IV) tetraisopropoxide ($Ti(O^iPr)_4$), other titanium halide or titanium alkoxide, or combinations of these.

In embodiments, processes for making the heterogeneous procatalyst include hydrocarbon solvent. The hydrocarbon solvent may be chosen from non-halogenated $(C_3-C_{30})$alkyl or non-halogenated $(C_3-C_{30})$cycloalkyl solvents. In some embodiments, the hydrocarbon solvent may include an isoparaffin solvent. Examples of isoparaffin solvents may include, but are not limited to, ISOPAR™ synthetic paraffin solvents available from ExxonMobile (e.g., ISOPAR™ E paraffin solvent), and special boiling point (SBP) solvents by Shell Chemicals (e.g., SBP 100/140 high purity de-aromatised hydrocarbon solvent). Other examples of hydrocarbon solvents may include isobutene, pentane, isopentane, cyclopentane, hexane, 2-methylpentane, 3-methylpentane, cyclohexanes, methylcyclopentane, heptane, 2-methylhexane, 3-methylhexane, octane, 2,2,4-trimethylpentane, tetradecane, and combinations thereof.

In one or more embodiments of the heterogeneous catalyst, the ratio of transition metal, M, (in the transition metal compound) to titanium is from 0.1 to 10 (mole/mole). All individual values and subranges encompassed by "from 0.1 to 10 (mole/mole)" are disclosed herein as separate embodiments; for example, the range "from 0.1 to 10 (mole/mole)" includes 0.2 to 5, 0.5 to 3, and 0.3 to 2 as subranges.

In one or more embodiments of the heterogeneous catalyst, the molar ratio of magnesium chloride to titanium is from 1 to 100 (mole of magnesium chloride per mole of titanium metal). All individual values and subranges encompassed by "from 1 to 100" are disclosed herein as separate embodiments; for example, the range "from 1 to 100" includes 8.0 to 80, 15 to 50, and 30 to 70 as subranges.

In one or more embodiments of the heterogeneous catalyst, the molar ratio of vanadium to titanium is from 0.1 to 10 (mole of vanadium metal per mole of titanium metal). All individual values and subranges encompassed by "from 0.1 to 10" are disclosed herein as separate embodiments; for example, the range "from 0.1 to 10 (mole/mole)" includes 0.2 to 5, 0.5 to 3, and 0.3 to 4 as subranges.

Cocatalyst Component

The heterogeneous procatalyst according to this disclosure may be combined with a cocatalyst to form a Zeigler-Natta catalyst. The Zeigler-Natta catalyst comprising the heterogeneous procatalyst may be rendered catalytically active by any technique known in the art for activating Zeigler-Natta type procatalysts of olefin polymerization reactions. For example, the heterogeneous procatalyst may be rendered catalytically active by contacting the procatalyst to, or combining the procatalyst with, an activating cocatalyst. Suitable activating cocatalysts for use herein include alkyl aluminums, including polymeric or oligomeric alumoxanes (also known as aluminoxanes). Combinations of one or more of the foregoing activating cocatalysts are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane. In some embodiments, the cocatalyst may be chosen from an alkyl of aluminum, a haloalkyl of aluminum, an alkylaluminum halide, and mixtures thereof. In some embodiments, the cocatalyst may be chosen from triethylaluminium, trimethylaluminium, tri-n-butylaluminium, triisobutylaluminium, tri-n-hexylaluminium, tri-n-octylaluminium, diethylaluminum chloride, MAO, MMAO, diethylaluminum ethoxide, and mixtures thereof.

Polyolefins

The catalytic systems described in this disclosure may be utilized in the polymerization of olefins primarily ethylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the catalyst systems may produce ethylene-based polymers that include at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments, the catalyst system produces ethylene-based polymers having an amount of additional α-olefin that is less than 50 mole percent (mol %); in other embodiments the amount of additional α-olefin includes at least 0.01 mol % to 25 mol %; and in further embodiments the amount of additional α-olefin includes at least 0.1 mol % to 10 mol %. In some embodiments, the additional α-olefin is 1-octene or 1-hexene.

Any conventional polymerization processes may be employed to produce the ethylene-based polymers in the presence of the catalyst system comprising a heterogeneous procatalyst of this disclosure. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example. In one embodiment, the ethylene-based polymer may be produced via solution polymerization in a dual reactor system, for example a dual loop reactor system, wherein ethylene and, optionally, one or more α-olefins are polymerized in the presence of the catalyst system, as described herein, and optionally one or more cocatalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system or a single stirred tank reactor system, in which ethylene and optionally one or more α-olefins are polymerized in the presence of the catalyst system, as described within this disclosure, optionally one or more cocatalysts, as described in the preceding paragraphs and optionally in combination with one or more other catalysts.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, the catalyst system that includes the heterogeneous procatalyst may produce ethylene-based polymers. The ethylene-based polymers may include at least one additional α-olefin. The ethylene-based polymers produced by a catalyst system comprising the heterogeneous procatalyst may have a density according to ASTM D792 (incorporated herein by reference in its entirety) from 0.850 $g/cm^3$ to 0.970 $g/cm^3$, from 0.870 $g/cm^3$ to 0.940 $g/cm^3$, from 0.870 $g/cm^3$ to 0.920 $g/cm^3$, or from 0.870 $g/cm^3$ to 0.900 $g/cm^3$, for example.

In another embodiment, the catalyst system that includes the heterogeneous procatalyst may produce polymers that have a melt flow ratio ($I_{10}/I_2$) from 5 to 15. The melt index, $I_2$, is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9, and in other the melt flow ratio is from 6 to 8

In some embodiments, the polymer resulting from the catalyst system that includes the heterogeneous catalyst has a molecular-weight distribution (MWD) by conventional gel permeation chromatography (GPC) from 1.5 to 25, where MWD is defined as $M_w/M_n$ with $M_w$ being a weight-average molecular weight and $M_n$ being a number-average molecular weight. In other embodiments, the polymers resulting from the catalyst system have a MWD from 1.5 to 6. Another embodiment includes a MWD from 1.5 to 3; and other embodiments include MWD from 2 to 2.5.

Test Methods

Specific surface area of $MgCl_2$ support was measured by Brunauer, Emmett, Teller (BET) Surface Area Method. A Tristar 3020 Surface Area Analyzer by Micromeritics was used. 30 mL of MgCl$_2$ slurry was filtered to remove solvent and then re-slurried in 30 mL of hexane. The resulting slurry was filtered again under inert atmosphere and washed with additional hexane. This process was repeated once to yield a filtercake of MgCl$_2$. Residual solvent was removed from the filtercake under vacuum. The filtercake was further dried on a Vac Prep 061 by Micromeritics using a 0.5 inch (1.27 cm) sample tube and a Transeal stopper designed for inert sample protection by loading a 0.2 g sample of the vacuum-dried MgCl$_2$ into the tube under inert atmosphere with a Transeal stopper. The sample tube was connected to the Vac Prep 061 unit with nitrogen purging. The sample tube was treated with vacuum by opening the Transeal stopper and the evacuated tube was placed in a heating block with an aluminum tube protector. The sample was dried under the vacuum on the Vac Prep 061 unit at 110° C. for 3 hours. Afterward, nitrogen was introduced into sample tube. The dried sample was allowed to cool to room temperature before disconnecting the sample tube from the Vac Prep 061 unit to give a fully dried sample. Under inert atmosphere, 0.1500 to 0.2000 g of the fully dried sample was transferred into a clean sample tube with a tube filler rod. The sample tube was then sealed with a Transeal stopper and connected to the Tristar 3020 instrument for surface area measurement. QUICKSTART method was used for acquiring data.

Melt index (MI), or I2, was measured in accordance with ASTM D 1238-10, Condition 190° C./2.16 kg, Procedure B, and was reported in grams eluted per 10 minutes (g/10 min). I10 was measured in accordance with ASTM D 1238-10, Condition 190° C./10 kg, Procedure B, and was reported in grams eluted per 10 minutes (g/10 min).

For gel permeation chromatography (GPC), the chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-μm pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 g/mol Mw.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) was measured on a 200 microliter injection according to the following equations:

$$\text{Plate Count} = 5.54 * \left( \frac{RV_{Peak\ Max}}{\text{Peak Width at } \frac{1}{2} \text{ height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, peak max is the maximum position of the peak, one tenth height is ⅒ height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum_i IR_i}{\sum_i (IR_i / M_{polyethylene_i})} \quad (EQ\ 4)$$

$$M_w = \frac{\sum_i (IR_i * M_{polyethylene_i})}{\sum_i IR_i} \quad (EQ\ 5)$$

$$M_z = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$Flowrate_{effective} = Flowrate_{nominal} \times \frac{FlowMarker_{Calibration}}{FlowMarker_{Observed}} \quad (EQ\ 7)$$

Improved comonomer content distribution (iCCD) analysis was performed with Crystallization Elution Fractionation instrumentation (CEF) (PolymerChar, Spain) equipped with a IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless was installed just before the IR-5 detector in the detector oven. Ortho-dichlorobenzene (ODCB, 99% anhydrous grade or technical grade) was used. Silica gel 40 (particle size 0.2-0.5 mm, catalogue number 10181-3) from EMD Chemicals was obtained (can be used to dry ODCB solvent before). The CEF instrument is equipped with an autosampler with $N_2$ purging capability. ODCB is sparged with dried nitrogen ($N_2$) for one hour before use. Sample preparation was done with autosampler at 4 mg/mL (unless otherwise specified) under shaking at 160° C. for 1 hour. The injection volume was 300 µL. The temperature profile of iCCD was: crystallization at 3° C./min from 105° C. to 30° C., the thermal equilibrium at 30° C. for 2 minute (including Soluble Fraction Elution Time being set as 2 minutes), and elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length) by ¼" (ID) (0.635 cm) stainless tubing. The column packing and conditioning were with a slurry method according to the reference (Cong, R.; Parrott, A.; Hollis, C.; Cheatham, M. WO2017/040127A1). The final pressure with TCB slurry packing was 150 Bars.

Column temperature calibration was performed by using a mixture of the Reference Material Linear homopolymer polyethylene (having zero comonomer content, Melt index (I2) of 1.0, polydispersity Mw/Mn approximately 2.6 by conventional gel permeation chromatography, 1.0 mg/mL) and Eicosane (2 mg/mL) in ODCB. The iCCD temperature calibration consisted of four steps: (1) Calculating the delay volume defined as the temperature offset between the measured peak elution temperature of Eicosane minus 30.00° C.; (2) Subtracting the temperature offset of the elution temperature from the iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000 g/mol). All of these reference materials were analyzed in the same way as specified previously at 4 mg/mL. The modeling of the reported elution peak temperatures as a function of octene mole % using linear regression resulted in Equation 8 (EQ8) for which R2 was 0.978.

(Elution Temperature in Degrees $C$.)=−6.3515 (Octene $Mol\%$)+101.000  EQ8

For the whole resin, integration windows are set to integrate all the chromatograms in the elution temperature (temperature calibration is specified above) range from 23.0° C. to 115° C. The weight percentage of the high density fraction of the resin (HDF) is defined by the following Equation 9 (EQ9):

$$HDF = \frac{\text{(integrated area of elution window 95-115° C.)}}{\text{(integrated area of entire elution window 23-115° C.)}} \times 100\% \quad EQ\ 9$$

Examples

The following examples are provided to illustrate embodiments described in this disclosure and are not intended to limit the scope of this disclosure or its appended claims.

Procatalyst Preparation $MgCl_2$ slurry is prepared according to description in the "Magnesium halide support" section in WO2018005821A1.

All procatalyst preparations were performed within a nitrogen purged glovebox. Each heterogeneous procatalyst was prepared by sequential room temperature additions (with stirring) of stock solutions of procatalyst components in hexane (0.25 M) to a $MgCl_2$ slurry (0.2 M in Isopar-E). Procatalyst components were added to $MgCl_2$ in the order of $Et_2AlCl$, transition metal or main group metal component (if any), and $TiCl_4$ for all procatalysts except Ex. 15-17 wherein the order of transition metal component and $TiCl_4$ was reversed. The reaction time for each reaction step is about 12 hours. For example, procatalyst 12 Al-1Ti-0.25 Zn in Example 1 was prepared by adding $EtAlCl_2$ to $MgCl_2$ slurry. After stirring at room temperature for 12 hours, a $TiCl_4$ solution was introduced to the mixture. After the reaction was allowed to proceed at room temperature with agitation for another 12 hours, a hexane solution of zinc 2-ethylhexanoate ($Zn(EHA)_2$; ~80% in mineral spirit; EHA=2-ethylhexanoate) obtained from STREM Chemical, Inc. was added and the mixture was stirred overnight at room temperature to yield the procatalyst. The molar ratio of the individual components (relative to 40 equivalents of Mg) are listed in Tables 1-5.

Batch Polymerization of Ethylene/Octene

Solution batch ethylene/1-octene polymerizations were carried out in a stirred one-gallon reactor, which was charged with 250 g of 1-octene ($C_8$) and 1330 g of ISOPAR-E™. The reactor was heated to 190° C. and then saturated with ethylene (450 psig) in the presence of hydrogen (typically 40 mmol). The catalyst premix and cocatalyst (triethylaluminum, TEA; TEA/Ti=15 (molar ratio)) were mixed briefly (1-5 min) in an overhead shot tank before injection to the reactor. The polymerization was allowed to proceed for 10 minutes during which time the ethylene pressure was maintained via on-demand ethylene feed. After which time the bottom valve was opened and the contents transferred to a glass kettle and mixed with an antioxidant solution (1 mL of toluene containing 0.1 g IRGAFOS 168 and 0.05 g of IRGANOX 1010). The contents were poured onto a Mylar lined pan, cooled, and allowed to stand in a hood overnight. The resin was then dried in a vacuum oven at 60° C. for 48 hr. Catalyst loadings typically ranged from 1-3 micromoles Ti.

TABLE 1

Heterogeneous Procatalyst Compositions with Zinc and the Polymers Produced therefrom

| | | Procatalyst Component | | | | Polymerization Results | | | | |
|---|---|---|---|---|---|---|---|---|---|---|
| Example | Procatalyst | $EtAlCl_2$/40 Mg | $TiCl_4$/40 Mg | X/40 Mg | X Reagent | Efficiency (kg polymer/g Ti) | Mw (g/mol) (GPC) | % HDF (iCCD) | HDF Change (%)* | $I_{10}/I_2$ |
| Comp. 1 | 12 Al—1 Ti | 12 | 1 | 0 | None | 273 | 93,402 | 15 | 0 | 7.6 |
| Ex. 1 | 12 Al—1 Ti—0.25 Zn | 12 | 1 | 0.25 | $Zn(EHA)_2$ | 327 | 91,879 | 13 | −13 | 7.5 |
| Ex. 2 | 12 Al 1 Ti—0.5Zn | 12 | 1 | 0.5 | $Zn(EHA)_2$ | 406 | 93,273 | 12 | −20 | 7.6 |
| Ex. 3 | 12 Al—1 Ti—1 Zn | 12 | 1 | 1 | $Zn(EHA)_2$ | 429 | 95,401 | 10 | −33 | 7.6 |
| Ex. 4 | 12 Al—1 Ti—2 Zn | 12 | 1 | 2 | $Zn(EHA)_2$ | 529 | 90,142 | 9 | −40 | 7.5 |
| Comp. 2 | 12 Al—2 Ti | 12 | 2 | 0 | None | 351 | 101,122 | 17 | 0 | 7.5 |
| Ex. 5 | 12 Al—2 Ti—0.25 Zn | 12 | 2 | 0.25 | $Zn(EHA)_2$ | 359 | 87,318 | 14 | −18 | 7.6 |
| Ex. 6 | 12 Al—2 Ti—0.5 Zn | 12 | 2 | 0.5 | $Zn(EHA)_2$ | 345 | 89,110 | 12 | −29 | 7.6 |
| Ex. 7 | 12 Al—2 Ti—1 Zn | 12 | 2 | 1 | $Zn(EHA)_2$ | 373 | 93,810 | 11 | −35 | 7.4 |

*Percentage of change in HDF over baseline procatalyst containing the same level of Ti but without transition metal component In Table 1, the procatalysts Comparative 1 ("Comp. 1") and Examples 1 to 4 contained 1 Ti per 40 $MgCl_2$. The procatalysts in Examples 1 to 4 also contained a non-reducing, hydrocarbon-soluble $Zn(EHA)_2$. The addition of $Zn(EHA)_2$ to the procatalysts in Examples 1 to 4 reduced the content of high density fraction (HDF) in produced polymer when compared to the polymer produced by Comp. 1. In addition, as the Zn content in the procatalyst increased, the HDF of the produced polymer became lower while catalyst efficiency became higher. Similar trends in HDF and catalyst efficiency were also observed for procatalysts containing 2 Ti per 40 $MgCl_2$ (Ex. 5-7 vs. Comp. 2).

TABLE 2

Heterogeneous Procatalyst Compositions with Various Transition Metals and the Polymers Produced therefrom

| | | Procatalyst Component | | | | Polymerization Results | | | | |
|---|---|---|---|---|---|---|---|---|---|---|
| Example | Procatalyst | $EtAlCl_2$/40 Mg | $TiCl_4$/40 Mg | X/40 Mg | X Reagent | Efficiency (kg polymer/g Ti) | Mw (g/mol) (GPC) | % HDF (iCCD) | HDF Reduction (%)* | $I_{10}/I_2$ |
| Comp. 1 | 12 Al—1 Ti | 12 | 1 | 0 | None | 273 | 93,402 | 15 | 0 | 7.6 |
| Ex. 8 | 12 Al—1 Ti—.5 Cu | 12 | 1 | 0.5 | $Cu(EHA)_2$ | 446 | 94,041 | 14 | −7 | 7.4 |
| Ex. 9 | 12 Al—1 Ti—1 Cu | 12 | 1 | 1 | $Cu(EHA)_2$ | 502 | 90,909 | 12 | −20 | 7.5 |
| Ex. 10 | 12 Al—1 Ti—.5 Co | 12 | 1 | 0.5 | $Co(EHA)_2$ | 673 | 93,583 | 11 | −27 | 7.6 |
| Ex. 11 | 12 Al—1 Ti—1 Co | 12 | 1 | 1 | $Co(EHA)_2$ | 696 | 94,361 | 10 | −33 | 7.5 |
| Ex. 12 | 12 Al—1 Ti—2 Mn | 12 | 1 | 2 | $Mn(EHA)_2$ | 565 | 83,797 | 10 | −33 | 7.6 |
| Comp. 3 | 12 Al—1 Ti—2 Ca | 12 | 1 | 2 | $Ca(EHA)_2$ | 545 | 92,935 | 16 | +7 | 7.4 |
| Comp. 4 | 12 Al—1 Ti—2 Mg | 12 | 1 | 2 | $Mg(EHA)_2$ | 915 | 107,574 | 15 | 0 | 7.5 |
| Comp. 5 | 10 Al—1 Ti—2 V | 10 | 1 | 2 | $VOCl_3$ | 1229 | 105,108 | 14 | −7 | 6.8 |

*Percentage of change in HDF over baseline procatalyst containing the same level of Ti but without transition metal component The procatalysts in Table 2 contained Al, Ti, MgCl$_2$, and one of copper, cobalt or manganese, as the transition metal with oxidation state of 2+. The inventive procatalysts in Examples 9-12 produced polymers having a HDF of less than 12% except for the procatalyst in Ex. 8, which contain a low level of Cu(2+). When the procatalyst included a higher Cu(2+) level, the reduction in HDF in the produced polymer became more obvious. In comparison, the comparative procatalysts that do not contain a transition metal (Comp. 3), or contain a 5+ transition metal (Comp. 5), or contain a 2+ main group metal (Comp. 3 and 4) produced polymers having a higher HDF of 14% to 16%.

TABLE 3

Heterogeneous Procatalyst Compositions with various transition metals and the Polymers Produced therefrom

| | | Procatalyst Component | | | | | Polymerization Results | | | |
|---|---|---|---|---|---|---|---|---|---|---|
| Example | Procatalyst | EtAlCl$_2$/40 Mg | TiCl$_4$/40 Mg | X/40 Mg | X Reagent | Efficiency (kg poly./g Ti) | Mw (g/mol) (GPC) | % HDF (iCCD) | HDF Reduction (%)* | $I_{10}/I_2$ |
| Comp. 1 | 12 Al—1 Ti | 12 | 1 | 0 | None | 273 | 93,402 | 15 | 0 | 7.6 |
| Ex. 13 | 12 Al—1 Ti—2 Cr | 12 | 1 | 2 | Cr(EHA)$_3$ | 463 | 81,623 | 10 | 33 | 7.5 |
| Ex. 14 | 12 Al—1 Ti—2 Fe | 12 | 1 | 2 | Fe(OEt)$_3$ | 565 | 83,246 | 10 | 33 | 7.5 |

*Percentage of change in HDF over baseline procatalyst containing the same level of Ti but without transition metal component The procatalysts in Examples 13 and 14 contained a transition metal having a +3 oxidation state. The procatalyst in Example 13 contained Cr and produced polymers with a 10% HDF, which was a 33% reduction in HDF compared to polymer resin produced by the procatalyst having no transition metal as in Comp. 1. The procatalyst in Example 13 contained iron and produced polymers with a 10% HDF. The procatalysts in Examples 1-13 contained hydrocarbon-soluble, non-reducing transition metal compounds, in which each transition metal compound contained a carboxylate anion. In Example 14, the anionic ligand of the hydrocarbon-soluble, non-reducing transition metal compound was an alkoxide ligand, and the procatalyst produced a polymer resin having a reduction in HDF.

TABLE 4

Heterogeneous Procatalyst Compositions with various transition metals and the Polymers Produced therefrom

| | | Procatalyst Component | | | | | Polymerization Results | | | |
|---|---|---|---|---|---|---|---|---|---|---|
| Example | Procatalyst | EtAlCl$_2$/40 Mg | X/40 Mg | X Reagent | TiCl$_4$/40 Mg | Efficiency (kg poly/g Ti) | Mw (g/mol) (GPC) | % HDF (iCCD) | HDF Reduction (%)* | $I_{10}/I_2$ |
| Comp. 1 | 12 Al—1 Ti | 12 | 0 | None | 1 | 273 | 93,402 | 15 | 0 | 7.6 |
| Ex. 15 | 12 Al—1 Ti—2 Mn | 12 | 2 | Mn(EHA)$_2$ | 1 | 530 | 80,480 | 10 | 33 | 7.8 |
| Ex. 16 | 12 Al—1 Ti—2 Cr | 12 | 2 | Cr(EHA)$_3$ | 1 | 467 | 78,924 | 10 | 33 | 7.4 |
| Ex. 17 | 12 Al—1 Ti—2 Fe | 12 | 2 | Fe(OEt)$_3$ | 1 | 505 | 84,622 | 10 | 33 | 7.5 |

*Percentage of change in HDF over baseline procatalyst containing the same level of Ti but without transition metal component

TABLE 5

Heterogeneous Procatalyst Compositions with various transition metals and the Polymers Produced therefrom

| | | Procatalyst Component | | | | | | Polymerization Results | | | |
|---|---|---|---|---|---|---|---|---|---|---|---|
| Example | Procatalyst | EtAlCl$_2$/40 Mg | TiCl$_4$/40 Mg | X/40 Mg | X Reagent | Y/40 Mg | Y Reagent | Efficiency (kg polymer/g Ti) | Mw (g/mol) (GPC) | % HDF (iCCD) | HDF Reduction (%)* | $I_{10}/I_2$ |
| Comp. 5 | 10 Al—1 Ti—2 V | 10 | 1 | 2 | VOCl$_3$ | 0 | none | 1229 | 105,108 | 14 | 0 | 6.8 |
| Ex. 18 | 10 Al—1 Ti—2 V—2 Zn | 10 | 1 | 2 | VOCl$_3$ | 2 | Zn(EHA)$_2$ | 1466 | 103,735 | 9 | −36 | 6.7 |

*Percentage of change in HDF over baseline procatalyst containing the same level of Ti but without transition metal component Procatalysts Comp. 5 and Ex. 18 contained an additional transition metal V, which increased the polymer Mw and catalyst efficiency compared to Comp. 1. In Ex. 18, Zn(EHA)$_2$ was incorporated into the procatalyst composition. The hydrocarbon-soluble, non-reducing transition metal compound of Ex. 18 produced polymers with a substantially reduced HDF while maintaining high Mw and high catalyst efficiency.

The procatalysts in Examples 15-17 were prepared by altering the order in which each of components were added. The X reagent was added before TiCl$_4$ as opposed to the procatalysts in Table 3, in which TiCl$_4$ was added before the X reagent. When the results in Table 3 are compared to the results in Table 4, the efficiency of inventive procatalysts, the amount of HDF, the molecular weight, and the melt flow ratios of the produced polymers are similar. These results would indicate that the order in which the components are added to form the inventive procatalyst has no significant impact on the efficiency of the procatalyst nor the polymer produced by the procatalysts.

The invention claimed is:

1. A heterogeneous procatalyst comprising:
   a titanium species,
   a hydrocarbon-soluble transition metal compound having a structure M(OR$^1$), where:
      M is a non-reducing transition metal other than titanium, the non-reducing transition metal being in an oxidation state of +2 or +3;
      each R$^1$ is independently (C$_1$-C$_{30}$)hydrocarbyl or —C(O)R$^{11}$, where R$^{11}$ is (C$_1$-C$_{30}$)hydrocarbyl; and
      z is 2 or 3;
      wherein each R$^1$ and R$^{11}$ may be optionally substituted with one or more than one halogen atoms, or one or more than one —Si(R$^S$)$_3$, where each R$^S$ is (C$_1$-C$_{30}$) hydrocarbyl;
   a chlorinating agent having a structure A(Cl)$_x$(R$^2$)$_{3-x}$, where:
      A is aluminum or boron;
      R$^2$ is (C$_1$-C$_{30}$)hydrocarbyl; and
      x is 1 or 2; and
   a magnesium chloride component.

2. The procatalyst according to claim 1, wherein M is chosen from zinc, copper, cobalt, manganese, iron, or chromium.

3. The procatalyst according to claim 1, wherein M(OR$^1$)$_z$ is aliphatic or cycloaliphatic hydrocarbon-soluble.

4. The procatalyst according to claim 1, wherein the procatalyst further comprises a vanadium component.

5. The procatalyst according to claim 1, wherein the vanadium component is chosen from VX$_4$, VOX$_3$, or VO(OR$^3$)$_3$, where each X is independently a halogen atom or; and R$^3$ is (C$_1$-C$_{20}$)hydrocarbyl or —C(O)R$^{31}$, where R$^{31}$ is is (C$_1$-C$_{30}$)hydrocarbyl, wherein each R$^3$ and R$^{31}$ may optionally be substituted with one or more halogen atoms or one or more —Si(R$^S$)$_3$ where each R$^S$ is independently (C$_1$-C$_{30}$)hydrocarbyl.

6. The procatalyst according to claim 1, wherein the ratio of transition metal to titanium is from 0.1 to 10 (mole/mole).

7. The procatalyst according to claim 5, wherein the ratio of vanadium to titanium is from 0.1 to 10 (mole/mole).

8. The procatalyst according to claim 1, wherein the ratio of magnesium chloride to titanium is from 1 to 100 (mole/mole).

9. The procatalyst according to claim 1, wherein the magnesium chloride component has a surface area of greater than or equal to 100 m$^2$/g as measured according to the BET method.

10. A process for polymerizing ethylene-based polymers, the process comprising:
    contacting ethylene and optionally one or more α-olefins in the presence of a catalyst system, wherein the catalyst system comprises a heterogeneous procatalyst, the heterogeneous procatalyst comprising:
    a titanium species,
    a hydrocarbon-soluble transition metal compound having a structure M(OR$^1$)$_z$, where:
       M is a transition metal in an oxidation state of +2 or +3; and
       each R$^1$ is independently (C$_1$-C$_{30}$)hydrocarbyl or —C(O)R$^{11}$, wherein R$^{11}$ is (C$_1$-C$_{30}$)hydrocarbyl; and
       z is 2 or 3;
       wherein each R$^1$ and R$^{11}$ may be optionally substituted with one or more than one halogen atoms, or one or more than one —Si(R$^S$)$_3$, where each R$^S$ is (C$_1$-C$_{30}$) hydrocarbyl;
    a chlorinating agent having a structure A(Cl)$_x$(R$^2$)$_{3-x}$, where:
       A is aluminum or boron;
       R$^2$ is (C$_1$-C$_{30}$)hydrocarbyl; and
       x is 1 or 2; and
    a magnesium chloride component.

11. The process according to claim 10, wherein M is chosen from zinc, copper, cobalt, manganese, iron, or chromium.

12. The process according to claim 10 wherein the heterogeneous procatalyst further comprises a vanadium component.

13. The process according to claim 12, wherein the vanadium component is chosen from VX$_4$, VOX$_3$, or VO(OR$^3$)$_3$, where each X is independently a halogen atom or (; and R$^3$ is (C$_1$-C$_{20}$)hydrocarbyl or —C(O)R$^{31}$, where R$^{31}$ is is (C$_1$-C$_{30}$)hydrocarbyl, wherein each R$^3$ and R$^{31}$ may optionally be substituted with one or more halogen atoms or one or more —Si(R$^S$)$_3$ where each R$^S$ is independently (C$_1$-C$_{30}$)hydrocarbyl.

14. The process according to claim 10, wherein the ratio of transition metal to titanium is from 0.1 to 10 (mole/mole).

15. The process according to claim 13, wherein the ratio of vanadium to titanium is from 0.1 to 10 (mole/mole).

16. The process according to claim 10, wherein the ratio of magnesium chloride to titanium is from 5 to 100 (mole/mole).

17. The process according to claim 10, wherein magnesium chloride component is a magnesium chloride support that has a surface area of greater than or equal to 100 m$^2$/g as measured with the BET method.

18. The process according to claim 10, wherein the polymerization process is a solution polymerization process.

19. A process of making a procatalyst, the process comprising:
    preparing a MgCl$_2$ slurry in a hydrocarbon solvent; and
    mixing a chlorinating agent, a hydrocarbon-soluble transition metal compound, and a titanium species into the MgCl$_2$ slurry,
    wherein
       the transition metal compound has a structure M(OR$^1$)$_z$, where:
          M is a non-reducing transition metal in an oxidation state of +2 or +3;

each $R^1$ is independently $(C_1-C_{30})$hydrocarbyl or —C(O)$R^{11}$, wherein $R^{11}$ is $(C_1-C_{30})$hydrocarbyl; and z is 2 or 3;

wherein each $R^1$ and $R^{11}$ may be optionally substituted with one or more than one halogen atoms, or one or more than one —Si$(R^S)_3$, where each $R^S$ is $(C_1-C_{30})$hydrocarbyl; and the chlorinating agent has a structure $A(Cl)_x(R^2)_{3-x}$, where:

A is aluminum or boron;

$R^2$ is $(C_1-C_{30})$hydrocarbyl; and x is 1, 2, or 3.

20. The process of making the procatalyst according to claim 19, wherein the hydrocarbon solvent comprises non-halogenated $(C_3-C_{30})$alkyl or non-halogenated $(C_3-C_{30})$cycloalkyl.

\* \* \* \* \*